United States Patent [19]

Betts et al.

[11] Patent Number: 5,291,521
[45] Date of Patent: Mar. 1, 1994

[54] INDEX ASSIGNMENT IN REDUNDANCY-CODED DATA COMMUNICATION SYSTEMS

[75] Inventors: William L. Betts, St. Petersburg; Stanley Bottoms, Seminole, both of Fla.

[73] Assignee: AT&T Bell Laboratories, Murray Hill, N.J.

[21] Appl. No.: 820,113

[22] Filed: Jan. 13, 1992

Related U.S. Application Data

[63] Continuation-in-part of Ser. No. 530,144, May 29, 1990, Pat. No. 5,105,443.

[51] Int. Cl.⁵ .............................................. H04L 27/04
[52] U.S. Cl. ..................................... 375/59; 375/121; 371/43
[58] Field of Search ...................... 375/39, 54, 58, 121, 375/38, 59; 370/110.1, 110.4; 371/43, 37.1; 332/103

[56] References Cited

U.S. PATENT DOCUMENTS 4,941,154  7/1990  Wei .......................................... 375/39
5,056,117 10/1991  Gitlin et al. ............................ 371/43

Primary Examiner—Curtis Kuntz
Assistant Examiner—Tesfaldet Bocure
Attorney, Agent, or Firm—Ronald D. Slusky; Gerard A. deBlasi

[57] ABSTRACT

A modem which represents the transmitted primary data stream using signal points selected via a trellis code is provided with the further capability of transmitting secondary data. In particular, a standard constellation of signal points is expanded to include a number of signal points which is greater than that needed to transmit the primary data. Particular primary data word values are representable by either of a predetermined pair of signal points associated with that value—one signal point of the pair being a standard signal point and the other being an expanded signal point. The specific one of the two signal points of the pair that is transmitted at any given time is chosen as a function of whether the value of the next bit in the secondary data stream waiting to be transmitted is a "0" or a "1". The location of each expanded signal point in the constellation is selected such that its distance from the nearest signal point in the trellis code subset of its associated standard signal point is substantially at least as great as the minimum distance between any two signal points in that subset. Index values are assigned to the signal points of each subset in such a way that those index values change monotonically with increasing power of the signal points. Illustratively, in particular, the index values increase monotonically with increasing power of the signal points. Thus the signal point having the lowest power within a subset will have the lowest index value; the signal point having the second lowest power within a subset will have the second lowest index value; and so forth.

2 Claims, 4 Drawing Sheets

INDEX ASSIGNMENT IN REDUNDANCY-CODED DATA COMMUNICATION SYSTEMS

CROSS-REFERENCE TO RELATED APPLICATION

This is a continuation-in-part of United States patent application Ser. No. 530,144, filed May 29, 1990, entitled "Inband Coding of Secondary Data" issued on Apr. 14, 1992 as U.S. Pat. No. 5,105,443.

BACKGROUND OF THE INVENTION

The present invention relates to data transmission and, in particular, to the channel coding of data using trellis or other redundancy codes.

The co-pending, commonly assigned patent application of W. L. Betts et al filed Jan. 13, 1992, Ser. No. 07/820,111 entitled "Data Communication System with Data Rate Throttling," discloses an advantageous technique, referred to as "data rate throttling," in which the rate—in bits per second—at which data is channel mapped and transmitted over a communication channel can be easily varied in small increments via the use of a so-called modulus converter. The modulus converter itself is disclosed in another co-pending, commonly assigned patent application of W. L. Betts et al entitled "Modulus Converter for Fractional Rate Encoding," Ser. No. 588,658, filed Sep. 26, 1990.

The present invention is directed to a technique which can be used to particular advantage to realize systems which use the aforementioned data rate throttling technique in conjunction with trellis, or other, redundancy coding.

In redundancy coding, generally, the plurality of channel symbols, or signal points, which comprise the so-called symbol constellation are partitioned into a plurality of channel symbol subsets, typically in such a way that the channel symbols of the various subsets are well separated from one another. A portion of the data to be communicated—referred to as the "coded data"—is processed using a redundancy code, such as a trellis code, and the resulting coded output is used to identify a sequence of the subsets. Within a subset, each symbol has an assigned index value, and the rest of the data—referred to as the "uncoded data"—is used to generate an index value for each subset of the sequence, thereby selecting a particular symbol from each subset. A signal representing the sequence of symbols thus selected is then transmitted over the communication channel.

SUMMARY OF THE INVENTION

In accordance with the principles of the present invention, index values are assigned to the channel symbols of each subset in such a way that those index values change monotonically with increasing power of the signal points. Illustratively, in particular, the index values increase monotonically with increasing power of the signal points. Thus the signal point having the lowest power within a subset will have the lowest index value; the signal point having the second lowest power within a subset will have the second lowest index value; and so forth. This is advantageous because the upper limit of the range of index values that are output by the modulus converter increases (decreases) monotonically with increasing (decreasing) data rate and it is the modulus converter output which provides the aforementioned index values in response to the uncoded data. Thus, as data rate changes cause more or fewer channel symbols in each subset to be used for channel mapping at any given time, the channel symbols that are, in fact, used are, advantageously, always the signal points of lowest power within each subset.

DETAILED DESCRIPTION

Figure 1:
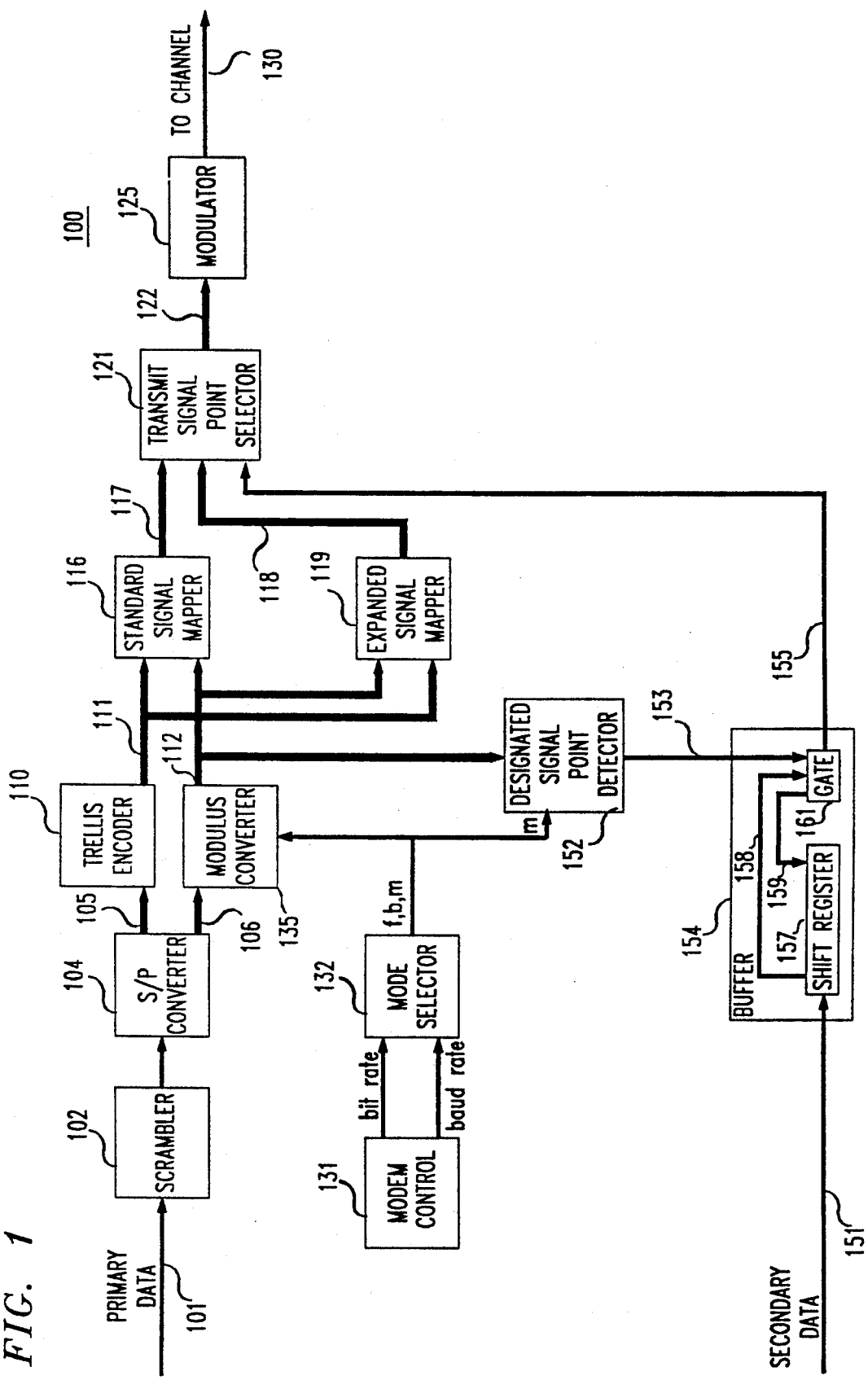
FIG. 1 is a block diagram of a transmitter for use in a voiceband modem embodying the principles of the invention.

Transmitter 100 of FIG. 1 receives a primary input bit stream at a predetermined input bit rate on lead 101 and generates at its output on lead 130 a telephone voiceband line signal representing a stream of two-dimensional output symbols, or signal points, which, in turn, represent the values of the input bits. This line signal is transmitted over a voiceband telephone channel to receiver 200 of FIG. 2, which receives the transmitted line signal from the channel on lead 201, identifies the transmitted signal points and thus, ultimately, the primary data stream, which is provided on receiver output lead 223.

At the same time, a stream of secondary data is applied to transmitter 100 on lead 151. This data, which has a relatively low data rate, e.g., 100 bps, is also represented in the aforementioned line signal, in a manner to be described, and recovered in the receiver. The recovered secondary data is provided as a receiver output on lead 242.

Figure 2:
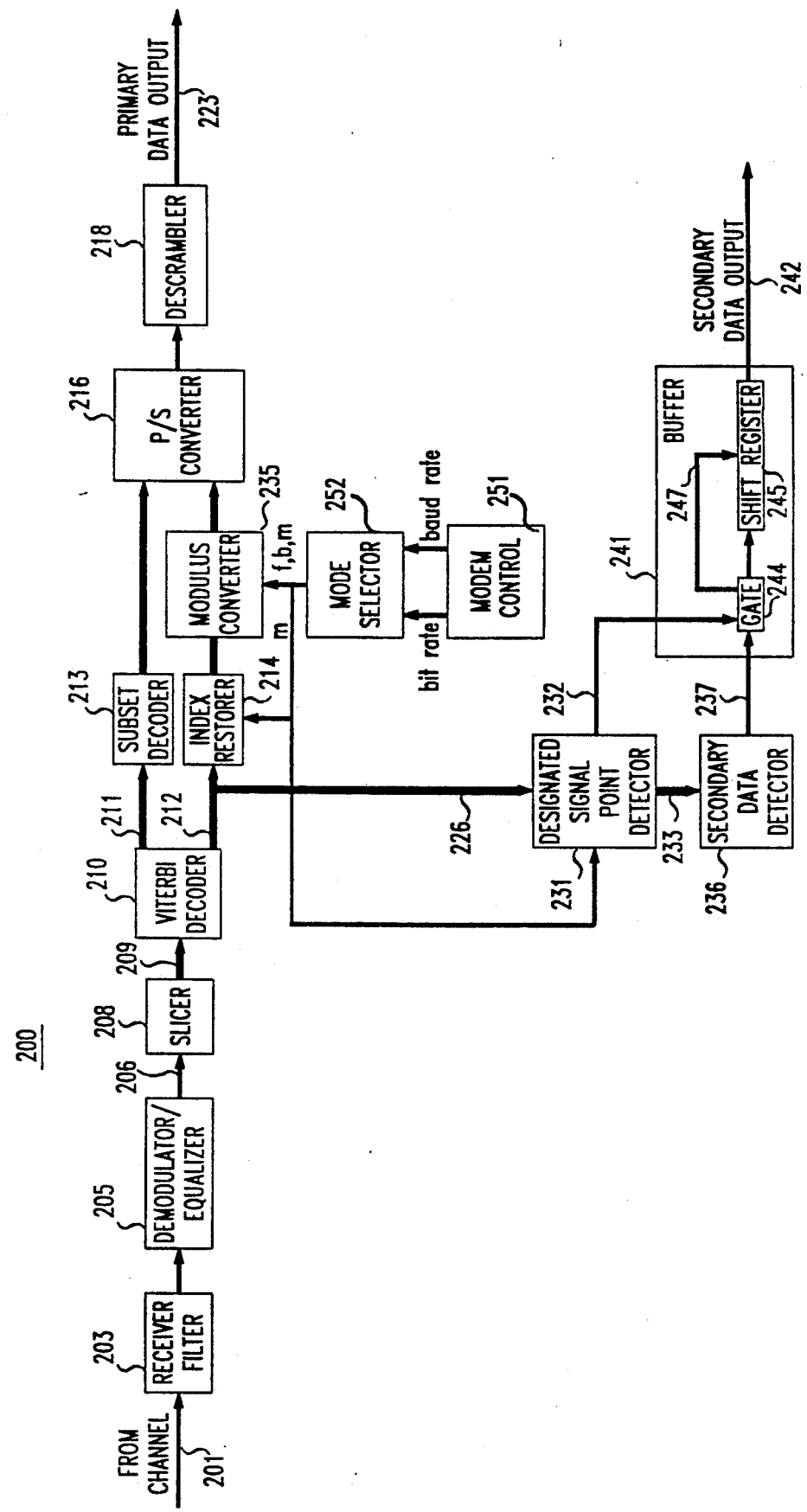
FIG. 2 is a block diagram of a receiver for use in a voiceband modem embodying the principles of the invention.
Figure 3:
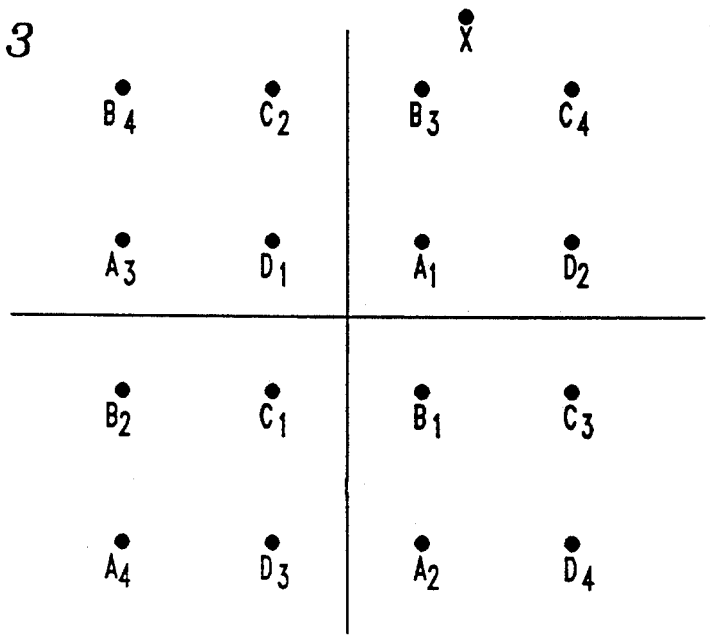
FIG. 3 depicts a standard signal point constellation that can be used to communicate primary data only.

Before continuing with a detailed description of the circuitry of FIGS. 1 and 2, reference is made to FIG. 3, which depicts a constellation of signal points that could conventionally be represented in the line signal that is output by transmitter 100 if only primary data were to be transmitted.

In particular, the constellation of FIG. 3 is comprised of 16 two-dimensional signal points. The signal points are divided into four predefined subsets A, B, C and D comprised of four signal points each. The signal points of subset A are labelled $A_1$, $A_2$, $A_3$ and $A_4$. The signal points of the other subsets are labelled correspondingly.

Transmitter 100 uses a trellis code to determine the sequence of output signal points. In implementing a system using the constellation of FIG. 3, the primary data bits are illustratively processed as three-bit words. One of the bits in each word—comprising its "coded" portion—is applied to a trellis encoder—a finite-state machine which generates a two-bit output identifying a particular one of the four subsets A through D from which the next transmitted signal point is to come. The other two bits of each input word—comprising its "uncoded" portion—are used to select, from the selected subset, the particular signal point to be transmitted. The selected output signal points are constrained to occur in certain subset sequences, as defined by the trellis code. It is this constraint which provides the system with the so-called "coding gain," which manifests itself in the form of an increased immunity to transmission errors induced by Gaussian noise.

In the receiver 200, the received signal point is typically offset from its original position in the constellation as the result of Gaussian noise and other channel impairments. A typical such received signal point is denoted as signal point "X" in FIG. 3. In order to identify the sequence of transmitted signal points represented by these offset received signal points, the receiver uses maximum likelihood decoding, also known as Viterbi decoding. The first step in this process is to determine the Euclidean distance from each received signal point, say the signal point X, to the nearest signal point of each subset. In this example, the signal points of the four subsets nearest to signal point X are $A_1$, $A_3$, $C_4$ and $D_2$. The resulting four parameters are then processed along with the four parameters measured for a number of subsequently received signal points—in a manner that is well known and need not be described in detail herein—in order to recover the most likely sequence of transmitted signal points. The three-bit words associated with the recovered signal points are then output on lead 223.

Figure 4:
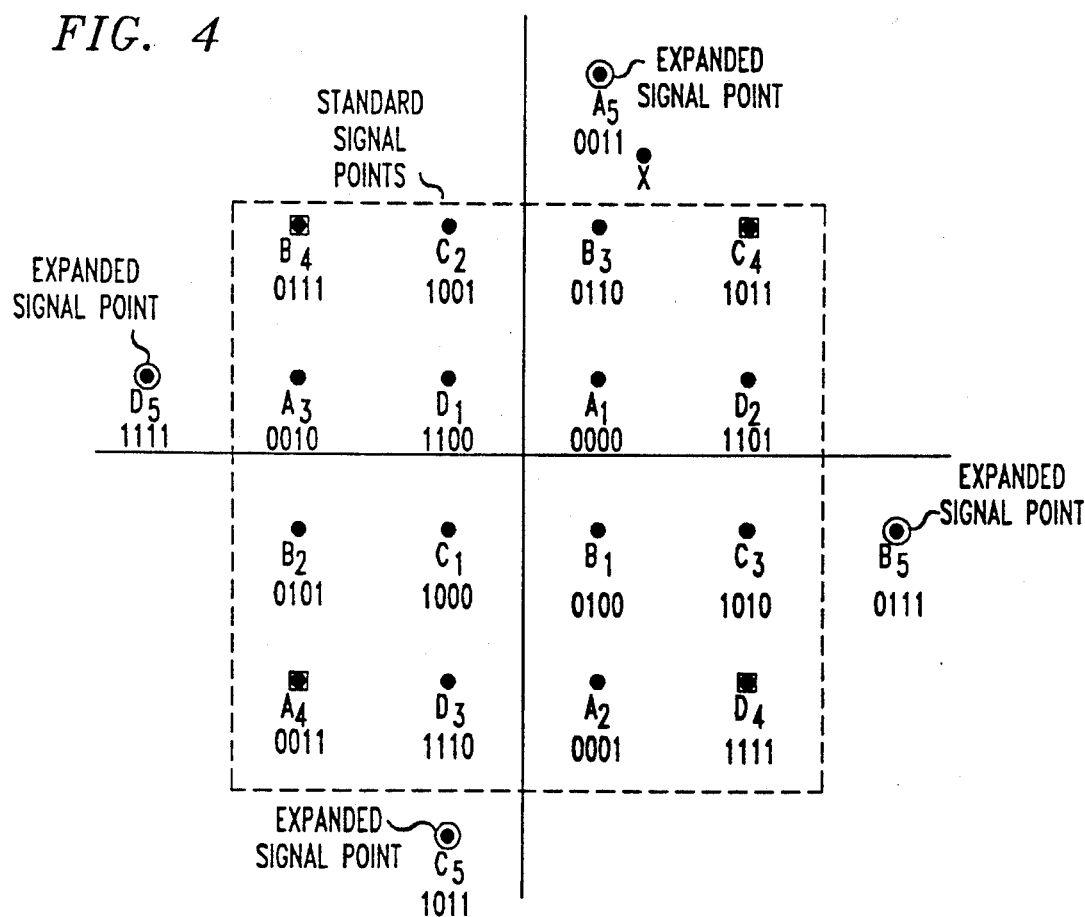
FIG. 4 depicts an expanded signal point constellation that can be used to communicate primary and secondary data.

In order to accommodate the transmission of secondary data along with the primary data, transmitter 100 illustratively selects its output signal points from the "expanded" constellation of FIG. 4, rather than from the standard constellation of FIG. 3. This expanded constellation includes the same 16 signal points, divided into the same four subsets, as the constellation of FIG. 3. Those 16 signal points are referred to herein as the "standard" signal points. However, this constellation also includes an additional four signal points, referred to herein as the "expanded" signal points. These four signal points are equally distributed among four subsets, i.e., one expanded signal point per subset. The expanded signal points in subsets A, B, C and D, denoted $A_5$, $B_5$, $C_5$ and $D_5$, respectively, are each enclosed in a circle in the FIG. Each expanded signal point is paired with an associated standard signal point in the same subset. Specifically, expanded signal point $A_5$ is paired with standard signal point $A_4$; expanded signal point $B_5$ is paired with standard signal point $B_4$; and so forth. The four signal points $A_4$, $B_4$, $C_4$ and $D_4$ associated with expanded signal points, referred to herein as "secondary data standard signal points," are each enclosed in a square in the FIG.

As before, the primary data bits are used to select first the subset and then the particular signal point within the subset that is to be transmitted in response to each three-bit input data word. However, whenever one of the secondary data standard signal points is the one that would be selected—for example, signal point $A_4$—reference is made to the next secondary data word—illustratively comprised of a single secondary data bit—waiting to be transmitted. If that bit is a "1" or, alternatively, if no bit at all is waiting to be transmitted, then the standard signal point is sent just as it would be if the system had no secondary data transmission capability. If, on the other hand, the secondary data bit waiting to be transmitted is a "0", then the expanded signal point associated with that standard signal point—for example, the expanded signal point $A_5$—is sent instead.

The aforementioned Viterbi decoding performed in the receiver is carried out just as before except that now, in determining the Euclidean distance between the received signal point and the nearest signal point of each subset, the expanded signal points must also be taken into account. Thus, for example, distance from received signal point X to the nearest signal point in subset A would now be determined to be the distance between signal point X and signal point $A_5$ rather than signal point $A_1$.

From the standpoint of recovering primary data, receptions of signal points $A_4$ and $A_5$ by receiver 200 are equivalent. That is, the same primary data bits will be output on lead 223 no matter which of those two signal points is determined (through the maximum likelihood decoding process) to have been sent. However, the receipt of signal point $A_4$ results in a secondary data bit value of "1" being output on lead 242 whereas the receipt of signal point $A_5$ results in a secondary data bit value of "0" being output on that lead.

The location of the expanded signal points within the constellation is important from the standpoint of preserving, to the maximum extent possible, the coding gain afforded by the trellis code. In particular, if expanded signal point $A_5$ happened to be placed where expanded signal point $D_5$ is, then the close proximity of signal point $A_5$ to signal point $A_3$ would significantly reduce the coding gain afforded by the trellis code. However, any loss of coding gain due to the presence of the expanded signal points is minimized by selecting the location of each expanded signal point such that its distance from the nearest signal point in the subset of its associated standard signal point—which is to say, the subset to which the expanded signal point has been assigned—is substantially at least as great as the minimum distance between any two signal points in that subset. Thus, for example, the distance of signal point $A_5$ from the signal point in subset A that it is closest to—namely, signal point $A_1$—is, in this example, the same as the distance between, for example, signal points $A_1$ and $A_3$, or between $A_3$ and $A_4$, etc.

In many data transmission environments, including voiceband data transmission over the telephone network, it is desirable to maximize the average power of transmitted data signals—consistent with whatever upper limit is imposed by the transmission network itself—in order to provide as large a signal-to-noise ratio as possible and, therefore, to minimize the transmission error rate. However, the expanded signal points added to a constellation, such as in FIG. 4, typically have greater power than the standard signal points with which they are associated. (The power of a point is a monotonic function of its Euclidean distance from the origin.) This, of course, would tend to increase the average power of the transmitted signal; and in order to keep within the average power constraints of the network, it may be necessary to reduce somewhat or "shrink" the constellation. This has the effect of bringing the points of the constellation "closer together" and, disadvantageously, tends to reduce the SNR margin.

In order to ameliorate this situation, it is desirable to pair up the expanded signal points with standard signal points which are the highest energy points within their respective subsets. In this way, the increase in signal power occasioned by the substitution of expanded signal points for standard signal points is kept to a minimum and thus the degradation of the performance of the system caused by the inclusion of the expanded signal points in the constellation is also kept to a minimum.

It is for this reason, referring specifically to FIG. 4, that expanded signal point $A_5$ is paired with standard signal point $A_4$, which has the highest power of all standard signal points in subset A, and so forth for each of the other subsets.

We are now in position to consider the circuitry of FIGS. 1 and 2 in greater detail. (In these FIGS., the lighter lead lines represent leads which carry either a single bit or an analog signal, while the darker lead lines each represent some number of parallel leads each of which carries a single bit or an analog signal.)

We turn, then, to transmitter 100 in FIG. 1. As noted earlier, the primary data is supplied on lead 101 in serial form. This data may have originated from, for example, a computer or data terminal. The primary data stream is processed conventionally by scrambler 102 and the resulting bit stream is applied to serial-to-parallel (S/P) converter 104 which generates output words on its leads 105 and 106.

The bits on lead 105 comprise the aforementioned coded portion of the word. In the present example, lead 105 carries a single bit from each data word. Trellis encoder 110 is a finite-state machine which processes the successive bits that appear on lead 105 to provide, for each word supplied by S/P converter 104, two bits on lead 111. Those bits identify the particular one of the four subsets A, B, C and D from which the next transmitted signal point is to come. For example, the bit patterns 00, 01, 10 and 11 on lead 111 may correspond to subsets A, B, C and D, respectively. The bits on lead 106 are processed by modulus converter 135 to provide, in a manner discussed to a greater extent hereinbelow, an index value on leads 112 identifying a particular one of the standard signal points within the identified subset. For example, the bit patterns 00, 01, 10 and 11 on lead 112 may correspond to the signal points having the subscripts 1, 2, 3 and 4, respectively (as denoted in FIG. 4). Putting it all together, then, bit values of 01 and 11 on leads 111 and 112, respectively, would identify signal point $B_4$. FIG. 4, in fact, shows the bit patterns associated with each of the standard and expanded signal points. The first two bits are a function of the subset to which the signal point belongs and the second two bits are a function of the uncoded bits.

(Although not explicitly shown in the FIG., transmitter 100 may include, as is standard, differential encoding circuitry as well.)

Leads 111 and 112 extend to standard signal mapper 116, which provides signals on its output lead 117 identifying the X and Y coordinate values (also referred to as in-phase and quadrature-phase, or more simply the "I" and "Q" values) of the identified signal point, which is always one of the standard signal points of the constellation. At the same time, however, leads 111 and 112 also extend to expanded signal mapper 119. This unit is similar to standard signal mapper 116 except that whenever the index on lead 112 is a "4"—thereby indicating that a secondary data standard signal point has been specified by trellis encoder 110—the X and Y coordinate values that are output by expanded signal mapper 119 are the coordinate values of the expanded signal point associated with that standard signal point. Thus in the example given above, the 01 and 11 on leads 111 and 112 would cause standard signal mapper 116 to output the coordinates of standard signal point $B_4$, while causing expanded signal mapper 119 to output the coordinates of expanded signal point $B_5$.

Of course, only one of those two signal points is to be transmitted, depending on the secondary data. To this end, secondary data bits that have been received from lead 151 have been stored in buffer 154, which is illustratively comprised of a shift register 157 and a gate 161. In accordance with the invention, the indices of the various signal points of each subset are assigned thereto in such a way that the index values change monotonically with increasing power of the signal points within the subset. Illustratively, in particular, the index values increase monotonically with increasing power of the signal points. Thus the signal point having the lowest power within a subset will have the lowest index value; the signal point having the second lowest power within a subset will have the second lowest index value; and so forth. In subset A, in particular, then, signal point $A_1$ has the lowest power and the lowest index, viz., "1"; signal points $A_2$ and $A_3$ have the next lowest power and the next lowest indices, viz., "2" and "3"; and signal point $A_4$ has the highest power and the highest index, viz., "4". A similar index assignment scheme applies to the other three subsets. One advantage of this approach is that all indices above a certain value—in this case, above the value "3"—are associated with signal points that carry secondary data, namely the standard signal points $A_4$, $B_4$, $C_4$ and $D_4$, and the expanded signal points $A_5$, $B_5$, $C_5$ and $D_5$. This makes recovery of the secondary data in the receiver relatively easy in that signal points that carry secondary data can easily be identified as those signal points whose index values exceed some value. A further, perhaps more important, advantage of the invention is discussed at a more opportune point hereinbelow.

The bit pattern on lead 112 is monitored by designated signal point detector 152, and whenever the index "4" appears thereon, detector 152 outputs a shift pulse on lead 153. This causes gate 161 to signal shift register 157 via control lead 159 to shift out the next secondary data bit waiting to be transmitted, which bit is thereupon supplied by gate 161 onto lead 155.

The secondary data bit on lead 155, in turn, controls transmit signal point selector 121—which is essentially a gate—to pass on to leads 122 the coordinates on leads 117, if that bit is a "1", or the coordinates on leads 118, if that bit is a "0". If no secondary data bit is available in buffer 154 when lead 153 is pulsed, the default output bit on lead 155 is a "1". (The manner in which receiver 200 is made to know whether such a "1" is to be interpreted as actual secondary data or not is described hereinbelow.)

In summary, then, it can be seen that for each primary data word whose uncoded bits are within a first predetermined set of values—in this example the values 00, 01 and 10—a respective standard signal point from the subset identified by the trellis encoder is selected, e.g., signal point $A_2$ associated with uncoded bit pattern 01. On the other hand, for each primary data word whose uncoded bits have at least one other value—in this example, the value 11—a signal point is selected from a pair of signal points in the identified subset—that pair being associated with the aforesaid other value. In this embodiment, then, the uncoded bit pattern 11 is associated with the signal point pair $A_4$ and $A_5$ in subset A, with the signal point pair $B_4$ and $B_5$ in subset B, etc. Selection of a particular signal point of the identified pair is then a function of an individual secondary data word—in this example $A_4$ if that word, or bit in this case, has the value "1" and $A_5$ if that word has the value "0".

Continuing with the processing within transmitter 100, the coordinates on leads 122 are passed to modulator 125 which, in standard fashion, generates a modulated line signal representing the stream of identified signal points. That signal is then applied to a telephone voiceband channel via lead 130.

Turning, now, to receiver 200, the transmitted line signal is received from the channel on lead 201. This signal is processed in conventional fashion through receiver filter 203 and demodulator/equalizer 205. The output of the latter on leads 206—which represents received signal point, such as the signal point X (FIG. 4)—is then applied to slicer 208. The job of the latter is to provide, for each subset, a quantity equal to the distance between point X and the nearest point of each of the four subsets. The resulting four quantities are thereupon applied to Viterbi decoder 210 which, upon processing the outputs from slicer 208 over a number of signaling intervals, determines what the most likely sequence of transmitted signal points was.

Specifically, Viterbi decoder 210 provides two bits on its output leads 211 for each signaling interval. Those two bits identify the subset to which the signal point currently being decoded belong. At the same time, Viterbi decoder 210 provides as output a signal on leads 212 identifying the index of the signal point. The latter output signal is applied to modulus converter 235, whose function is described in further detail hereinbelow. (Although not explicitly shown in the FIG., Viterbi decoder 210 may include differential decoding circuitry which provides the inverse function of the aforementioned differential encoding circuitry incorporated within trellis encoder 110 of transmitter 100.)

The signals on leads 211 and 212 are then decoded in order to recover the primary data bits. In particular, the subset identification on leads 211 is applied to subset decoder 213 which recovers the single, coded bit that was applied to trellis encoder on leads 105. A so-called systematic trellis code is illustratively used in this embodiment, so that the coded bit is, illustratively, nothing more than the bit on a particular one of the two leads 211.

Additionally, the index represented by the signals on leads 212 is converted by the combination of index restorer 214 and modulus converter 235 into the corresponding uncoded bit pattern. Index restorer 214 simply converts the index of any expanded signal point—in this example, the index "5"—into the associated standard signal point index—in this example, the index "4"—so that a standard signal point index is always provided to modulus converter 235. The latter performs the opposite function of modulus converter 135 by converting index values to uncoded bit values.

The bits output by decoder 213 and modulus converter 235 are then converted to serial form by parallel-to-serial (P/S) converter 216 and are descrambled by descrambler 218, which provides the inverse function of the scrambling performed by scrambler 102 in the transmitter. The primary data thus recovered is provided on receiver output lead 223.

At the same time, the secondary data is recovered by the remaining circuitry of receiver 200. In particular, designated signal point detector 231 operates similarly to designated signal point detector 152 in transmitter 100 to provide a shift pulse to buffer 241 whenever a signal point which carries a secondary data bit is output by Viterbi decoder 210. More specifically, that pulse is generated, as before, whenever the signal point index on lead 212 is either "4" or "5". The index value itself is passed to secondary data detector 236 via leads 233. Detector 236 outputs a "1" on its output lead 237 if the index value is "4" and a "0" if the index value is "5". Gate 244 within buffer 241, responsive to the shift pulse on lead 232, takes in the bit value thus provided on lead 237 and, via control lead 247, operates shift register 245 within the buffer to shift in that bit value (unless the bit is a "start" bit, as described hereinbelow). Circuitry (not shown) within the modem which utilizes the secondary data bits reads them out of shift register 245 onto lead 242 in conventional fashion.

Although a particular constellation is shown in FIG. 4, the invention can, of course, be used with any of a virtually limitless number of constellations, depending on the application. Thus, for example, the constellation of FIG. 4 is suitable for voiceband data transmission at, for example, a rate of 7.2 Kbps over a leased line. At higher speeds, or when transmission over dial-up lines is desired, larger constellations are typically more desirable.

Figure 5:
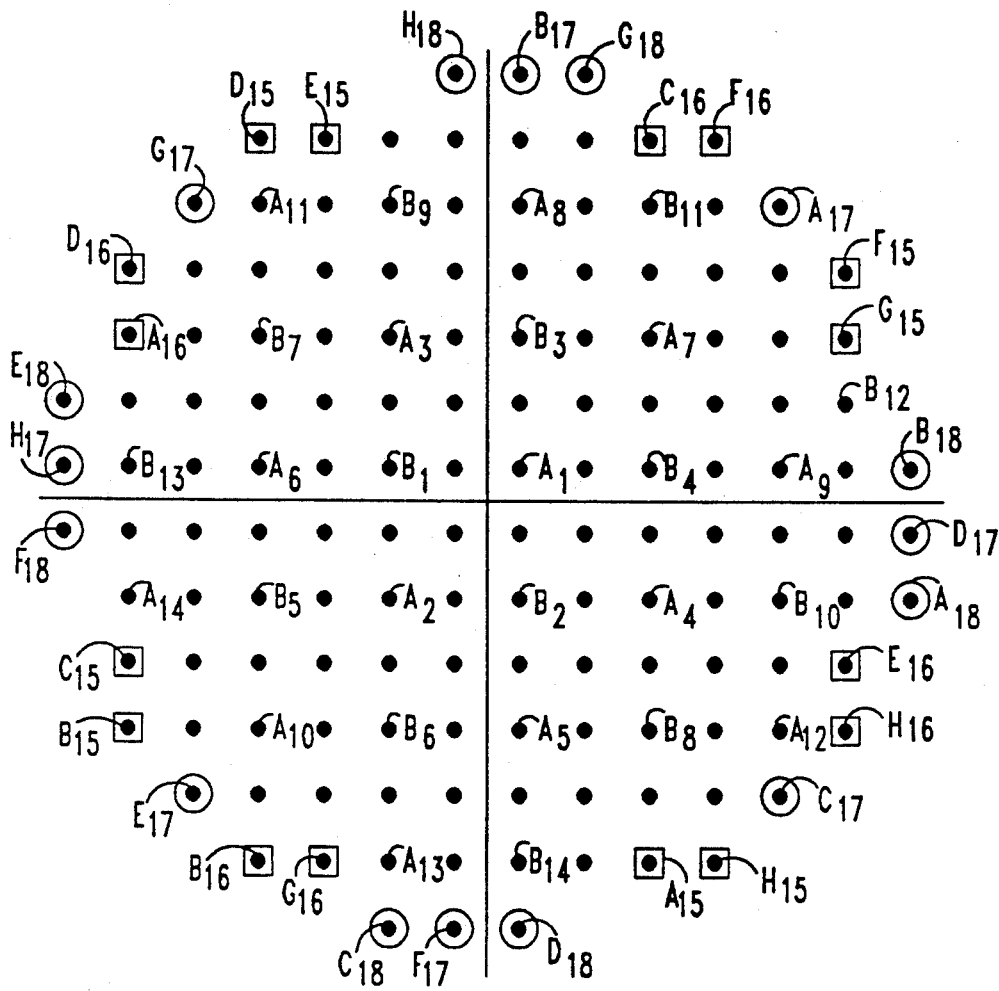
FIG. 5 depicts another expanded signal point constellation that can be used to communicate primary and secondary data.

Such a larger constellation is shown in FIG. 5. This constellation can be used, for example, for transmission over leased telephone lines at a data rate of 14.4 Kbps. The constellation has 128 standard signal points divided into eight subsets with 16 standard signal points in each subset. Because of the numerous signal points in this constellation, it is unwieldy to specifically label each signal point to show what subset it belongs to. However, the 16 standard points of two of the subsets, subsets A and B, are explicitly labelled so that the constituent signal points of at least those two subsets can be readily seen. Note that, in accordance with the invention, the index values, as in the constellation of FIG. 4, change monotonically with increasing power of the signal points within the subset and, in particular, increase monotonically with increasing power of the signal points. Other subsets are comprised of signal points laid out in similar geometric patterns. In particular, subsets C, E and G can be arrived at by clockwise rotation of subset A by 90, 180 and 270 degrees, respectively, while subsets D, F and H can be arrived at by clockwise rotation of subset B by 90, 180 and 270 degrees, respectively. In addition, there are two expanded signal points in each subset—rather than just one, as in the case of FIG. 4—for a total of 144 signal points. As in FIG. 4, the secondary data standard signal points are enclosed within squares while the expanded signal points are enclosed within circles. The first pair of signal points within subset A that represent data are standard signal point $A_{15}$ and expanded signal point $A_{17}$, while the second pair of signal points within subset A that represent data are standard signal point $A_{16}$ and expanded signal point $A_{18}$. The secondary data standard signal points and expanded signal points in the other seven subsets are labelled similarly.

In utilizing the constellation of FIG. 5, trellis encoder 110 illustratively processes bits in words of six bits each. Two of the bits in each word, provided on leads 105, are trellis-encoded to generate on leads 111 a three-bit output identifying a particular one of the eight subsets from which the next transmitted signal point is to come. The other four bits are used to select, from the selected subset, either a) a particular signal point to be transmitted or b) a signal point pair in the case where the trellis code identifies a secondary data standard signal point. In the latter case, as before, the value of a secondary data bit determines which signal point of the pair is to be used.

One other issue, alluded to hereinabove, needs to be discussed. That is the fact that since a secondary data standard signal point is transmitted both in the case where a secondary data bit is to be transmitted and in the case where no secondary data bit value is to be transmitted, some mechanism must be provided to enable the receiver to tell the difference.

One solution would be to modify the secondary data signaling scheme in such a way that the secondary bit value of "0" is assigned to half of the expanded points and a secondary bit value of "1" is assigned to the other half. With this approach, the standard signal points that are associated with expanded signal points do not convey secondary data information. This approach has the disadvantage, however, that it cannot support as high a secondary data rate as when standard signal points also carry secondary data values.

In this embodiment, a signaling format employing fixed-length secondary data words each preceded by a start bit is used to distinguish "1"s which, indeed, represent secondary data from "1"s which do not.

Figure 6:
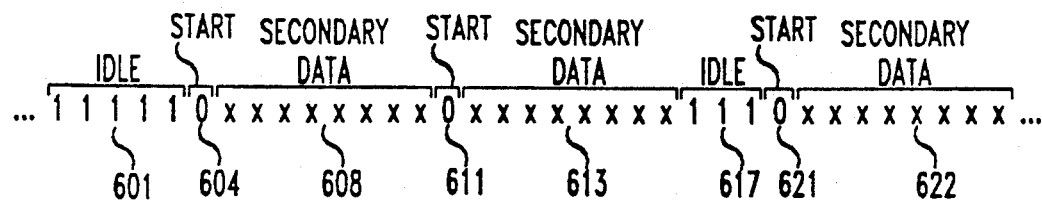
FIG. 6 is a timing diagram illustrating a format that can be used within the secondary data stream.

In particular, as shown in FIG. 6, the secondary data transmission circuitry begins in an idle state in which, as indicated at 601, only secondary data standard signal points, representing "1"s, are transmitted to the exclusion of any expanded signal points. In the meantime, incoming secondary data bits are queued up within the buffer in groups of eight-bit words each having a prepended start character—illustratively a start bit of value "0". Once gate 161 determines, via a control signal supplied from shift register 157 on lead 158, that there are eight secondary data bits ready to be transmitted, the gate responds to the first shift pulse thereafter appearing on lead 153 by outputting a "0"—which is the aforementioned start pulse—on lead 155, as indicated at 604 in FIG. 6. This "0" following on the aforementioned stream of "1"s is an indication to buffer 241 in the receiver that the eight bits that follow, indicated at 608, are all valid secondary data bits. Specifically, then, gate 161 responds to the next eight shift pulses by causing shift register 157 to output the next eight bits that it has queued up and, as noted earlier, those bits are supplied by gate 161 onto lead 155.

Assume, now, that by the time the last of the eight secondary data bits is transmitted, buffer 154 has ready another full eight bits. In this case, these bits are immediately sent, preceded, however, by another start bit, the start bit being indicated at 611 and the eight secondary data bits being indicated at 613. The appearance of start bit 611 immediately following the eighth bit of the previous eight-bit secondary data word 608 serves as an indication to buffer 241 that the eight bits that follow this second start bit are, indeed, secondary data bits.

At some point, buffer 154 will not have a full eight secondary data bits ready for transmission. In this case, buffer 154 will not respond to any shift pulses on lead 153 until such time as its eight bits are, in fact, ready for transmission. As a result, at least one secondary data standard signal point will be transmitted, resulting in one or more "1"s being conveyed in the secondary data stream. These "1"s, illustratively three of them, indicated at 617 in FIG. 6, serve as an indication to buffer 241 that the secondary data transmission is in an idle state, i.e., no secondary data is being sent. The later appearance of a "0", as indicated at 621, denotes the beginning of another eight bits of secondary data, as indicated at 622.

Advantageously, it will be appreciated that this scheme is capable of communicating the secondary data without requiring the use of a stop bit, as is characteristic of other asynchronous transmission schemes, thereby keeping the overhead associated with secondary data transmission to a minimum. This benefit arises out of the fact that although the secondary data transmission is, in one sense, asynchronous because a secondary data bit can be transmitted only when particular signal points are selected for transmission by the trellis encoder, it is engrafted onto a synchronous scheme in which the signal points which carry the primary and secondary data are transmitted synchronously.

A further functionality carried out by buffer 154 is to impose a limit on the maximum rate at which the secondary data is transmitted. Illustratively, this limitation is enforced by gate 161 which can selectively ignore shift pulses on lead 153, as needed, to keep the secondary data rate at or below the maximum desired rate by limiting the rate at which expanded signal points are allowed to be transmitted. This advantageously limits the increase in the average signal power of the transmitted line signal caused by the inclusion of the expanded signal points in the constellation, resulting from the fact that the occurrence in the transmitted signal of expanded signal points—which, again, will typically have higher power than the standard signal points—will be held to a predetermined upper limit.

At this point we address the function of modulus converters 135 and 235 in FIGS. 1 and 2, respectively. These units are described in detail in the commonly assigned, co-pending U.S. patent applications Ser. Nos. 588,658 entitled "Modulus Converter For Fractional Rate Encoding" and 588,656 entitled "Fractional Rate Modulation," both of which were filed on Sep. 26, 1990 and both of which are hereby incorporated by reference. It thus suffices to describe their operation generally.

In particular, modulus converters 135 and 235 allow the transmitter and receiver of FIGS. 1 and 2 to support various fractional bit rates—that is, where the ratio of the bit rate to the baud rate is not an integer. In particular, and considering first the transmitter, signals representing desired bit and baud rates are supplied in the transmitter by modem control 131—which may be a microprocessor that controls various aspects of the operation of the modem of which it is a part. Those bit- and baud-rate signals are applied to mode selector 132. The latter, responsive to the bit- and baud-rate signals generate a number of parameters, referred to as b, f and m in the aforementioned patent applications, which are supplied to modulus converter 135. The bit rate of the data on lead 106 going in to modulus converter 135 is the bit rate specified by modem control 131 less however many bits are applied to trellis encoder 110 on lead 105. Modulus converter 135 generates, on leads 112 at the specified baud rate, index values associated with the signal points of the subsets being identified on leads 111. In particular, modulus converter 135 uses a working set of m index values, where m is a modulus whose value depends on the bit rate/baud rate ratio. Thus if m is increased (decreased), the number of different signal points of each subset which are used to communicate the data also increases (decreases). Moreover, the upper limit of the range of index values that are output by the modulus converter, i.e., the largest value in the aforementioned working set of index values increases (decreases) monotonically with increasing (decreasing) data rate. In this embodiment, the index values are in the range 1 to m, inclusive, although they could be in any desired range, such as 0 to (m−1), in which case all index values shown in FIGS. 4 and 5 would simply be reduced by 1. (Note that the constellations of FIGS. 4 and 5 may need to be expanded in straightforward fashion to include more signal points in each subset than is explicitly shown, depending on how high the modulus m is caused to go.)

An advantage of the present invention can thus be appreciated. In particular, as data rate changes cause more or fewer channel symbols in each subset to be used for channel mapping at any given time, the channel symbols that are, in fact, used are—by virtue of the invention—advantageously always the signal points of lowest power within each subset.

In the receiver, the index values output by index restorer 214 are converted to uncoded bit values by modulus converter 235 which operates in response to parameters supplied by mode selector 252, which corresponds to mode selector 132 of FIG. 1. The latter, in turn, generates those parameters in response to modem control 251, which corresponds to modem control selector 131 of FIG. 1.

Note that as the value of m changes, thereby changing the number of signal points that are used at any given time, the signal points that serve as secondary data standard signal points and secondary data expanded signal points will also change. This is readily accomplished, as shown in the drawing, by providing detectors 152 (FIG. 1) and index restorer 214 and detector 231 (FIG. 2) with the value of modulus m from mode selectors 132 and 252, respectively.

The foregoing merely illustrates the principles of the invention. Thus, for example, the invention can be used with any desired subset-based signaling scheme, any desired constellation of any desired dimensionality, e.g., four or eight dimensions, and any desired data rates.

Additionally, the circuitry disclosed herein is, of course, merely illustrative. Indeed, although the various functional blocks disclosed herein are depicted as discrete circuitries, those various functions could be carried out using one or more programmed processors or digital signal processing (DSP) chips.

It will thus be appreciated that although the principles of the invention have been described herein in the context of particular illustrative embodiments, those skilled in the art will be able to devise numerous and various alternative arrangements which embody those principles and are within their spirit and scope.

We claim:

1. Apparatus for generating a signal representing data mapped into a succession of channel symbols of a predetermined signal constellation, said constellation comprising a plurality of signal points grouped into respective subsets and the signal points of each subset having respective assigned index values, said apparatus comprising means for identifying a sequence of said subsets in response to a first portion of said data, means for generating in response to a second portion of said data, for each identified subset of said sequence, the index value of a particular one of the signal points of that subset, and means for generating, as said signal, a signal representing the signal points whose index values are generated in said means for generating, the indices assigned to the signal points of each subset being monotonically increasing with increasing power of the signal points.

2. The invention of claim 1 wherein said means for identifying includes means for trellis coding said first portion of said data.

* * * * *